UNITED STATES PATENT OFFICE.

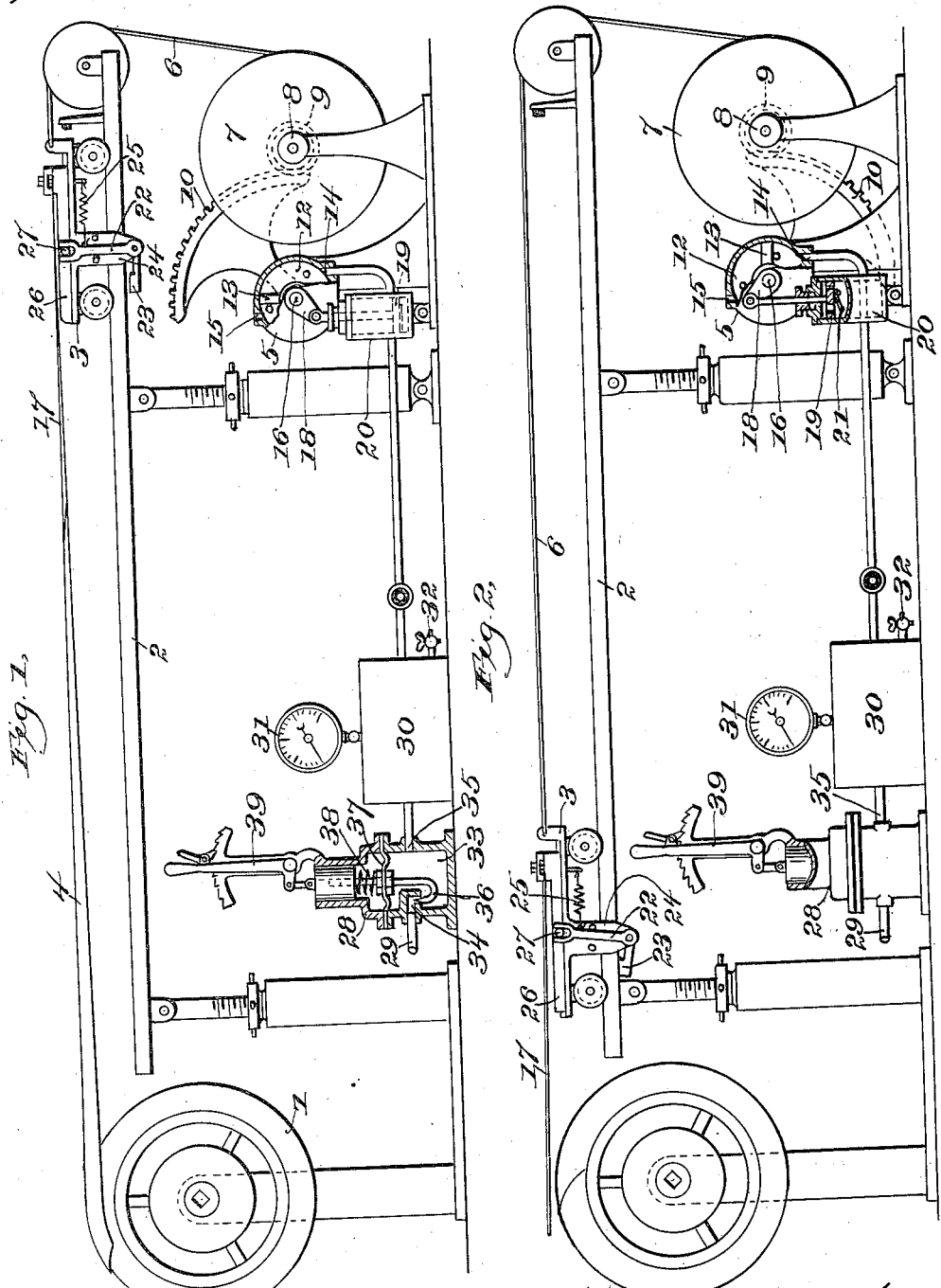

FREDERIC C. MORTON, OF NEW HAVEN, CONNECTICUT, ASSIGNOR OF ONE-HALF TO FRED BURTON CARLISLE, OF CRANSTON, RHODE ISLAND.

TENSION DEVICE FOR TIRE-BUILDING MACHINES.

1,298,769. Specification of Letters Patent. Patented Apr. 1, 1919.

Application filed April 23, 1914, Serial No. 834,029. Renewed August 2, 1918. Serial No. 248,073.

*To all whom it may concern:*

Be it known that I, FREDERIC C. MORTON, a citizen of the United States, residing in New Haven, in the county of New Haven and State of Connecticut, have invented an Improvement in Tension Devices for Tire-Building Machines, of which the following description, in connection with the accompanying drawings, is a specification, like letters on the drawings representing like parts.

This invention relates to tire building machinery of that type in which strips of fabric are shaped on a rotatable core to build up the carcass of the tire, which is subsequently finished by having the tread portion vulcanized thereon. In operating a machine of this type, the end of the strip is caused to adhere to the surface of the core or to the surface of a strip previously laid on the core, and the strip is then pulled along against a resisting tension by the rotation of the core. In the particular type of machine to which this invention especially applies the strip of fabric, after the free end thereof has been attached to the core, and prior to the rotation of the core, is stretched to a certain extent; the force which has been utilized in stretching the fabric being maintained to provide for the tension while the strip is being wound or laid on the core.

This invention relates especially to the stretching and tension device, the operating element of which in accordance with the present invention is a fluid pressure motor. In the machine shown as embodying the invention one end of the strip is secured to a traveling carriage connected with a fluid pressure motor and the other end of the strip is secured to the rotatable core.

After the strip has been placed in position, the fluid pressure motor is caused to operate so as to draw the carriage away from the core, thereby stretching the strip until the resistance thereof is sufficient to overcome the power of the motor. The core is then rotated without shutting off the source of fluid pressure which, therefore, maintains the stretching tension during the entire operation of laying the strip on the core. In order to maintain this tension even, the motor is provided with a pressure regulator and a small outlet, the former maintaining a predetermined pressure behind the motor piston, while the latter prevents any increase in pressure as the return movement of the piston decreases the capacity of the pressure chamber. The said outlet is so small that it does not materially waste pressure during the preliminary operation of the motor in stretching the fabric. The reducing valve is easily adjustable so that the amount of tension can be varied as required in the operation of building up a tire carcass. Since the pressure is at all times admitted to the motor it is obvious that as soon as the carriage has been released from the strip after the latter has been laid on the core it will return to its normal position through the operation of the motor. In order to prevent too rapid a return of the carriage the motor is provided with a dash pot or its equivalent so arranged as to permit a comparatively unresisted movement of the motor in one direction but to resist the movement of the motor in the other direction so as to prevent over speeding. In the preferred construction of the device the carriage is connected with the motor through a flexible connection such as a wire cable, and in order to prevent over speeding of the carriage through momentum and consequent slacking of the cable, the carriage itself is provided with an automatic brake which is so arranged as to operate only during the return movement thereof.

Figure 1 is a side elevation of a machine embodying the invention with parts shown in section; and Fig. 2 is a similar view showing the machine at a different period in the operation.

Referring to Fig. 1, the core 1 is mounted at one end of the machine and is adapted to be rotated by a motor, which is not herein shown, since this part of the machine is of the usual and well-known construction. Adjacent to the core 1 is a table or track 2 upon which is supported a carriage 3 to which may be connected one end of a strip of fabric 4, the other end of which at the beginning of the operation is attached to the core 1 as shown in Fig. 1. While the actual operation of laying on the strip of fabric over the core 1 is going on the carriage 3, resisted by the necessary tension is drawn toward the core until the strip has been completely laid on the surface of the core so that the ends of the strip overlap. The carriage is then released from the strip and automatically returned to its original position. Prior to the operation of laying on the strip, however, the said strip is stretched; and in accordance with this invention a fluid pressure motor 5 is employed the said motor being suitably connected with the carriage 3 so as to pull the said carriage away from the core 1 until the fabric 4 has been stretched to the necessary extent as shown in Fig. 1. This finishes the active part of the operation of the fluid pressure motor but the pressure is still retained and employed as the means for keeping the fabric under tension and in its stretched condition, while the strip and carriage are pulled by the rotating core. As herein shown, the carriage 3 is connected by a flexible cable 6 with a drum 7 rotatable in bearings 8 and having a pinion or gear 9, by which power is transmitted from the motor 5 through a gear or segment 10. I have shown the motor as consisting of a cylindrical casing having a chamber 12 containing a radial abutment 13 which serves as the piston or traveling element, and also having a fluid pressure inlet 14 and a vent 15. The radial abutment 13 is connected with a shaft 16 co-axial with the cylindrical chamber and carrying the segmental gear 10. If, therefore, the parts are in the position shown in Fig. 2, and fluid pressure is admitted to the chamber 12, the abutment 13 will be moved from the position shown in Fig. 2 to the position shown in Fig. 1 causing the movement of the carriage from its final to its initial position.

In the construction shown, the carriage 3 is provided with a dummy strip 17 to which the strip of fabric 4 is connected at the beginning of the operation as shown in Fig. 1; and in Fig. 2, where the strip of fabric is shown as completely laid on the core, the dummy strip 17 is shown as having been detached from the strip of fabric leaving the carriage 3 free to travel back. The pressure being continually admitted to the motor cylinder the motor will at once start its operation, causing the travel of the carriage from the position shown in Fig. 2 to that shown in Fig. 1.

The movement of the carriage being unresisted, very little power is required to bring it back; and in order to check the rapid movement which will ensue, I have shown the shaft 16 of the motor as connected through a crank arm 18 with a piston 19 in a dash pot 20. The said piston 19 which has a small permanent opening to admit of its retarded movement, is provided with a check valve 21 controlling a comparatively large opening, so that while the said piston 19 can move freely through the liquid in the dash pot 20 while the carriage is being pulled toward the core, the check valve will prevent the free flow of liquid through the piston during its movement in the opposite direction.

In view of the fact that the flexible connection 6 is utilized to connect the motor with the carriage, there is a liability that the carriage being free to run will speed up and overreach, thereby slacking up the flexible connection or cable and possibly throwing it off the pulleys over which it operates. To prevent this I have shown the carriage as provided with an automatic brake 22 herein shown as an elbow lever pivoted below the carriage support 2 and having a brake shoe 23 which is adapted to engage the under surface of said support. The lever 22 is pivoted to a lug 24, on that part of the carriage to which the flexible connection is directly fastened. It is also held in the position shown in Fig. 2 by means of a spring 25 when not otherwise acted upon, in which position the shoe is in frictional engagement with the under side of the track 2. In order to release the brake during the stretching and winding operations, the dummy strip 17 instead of being rigidly connected with the main portion of the carriage is connected with a sliding member 26 which has a limited movement with relation to the carriage, the said sliding member having a projection 27 engaging the lever 22 so that when the tension is put upon the strip the said sliding part will be pulled from the position shown in Fig. 2 to that shown in Fig. 1 thereby overcoming the tension of the spring 25 and releasing the brake.

Since very little power is required to restore the carriage to its normal position the amount of pressure required to furnish the desired tension may be adjusted so as to afford the tension necessary for the particular kind of tires which are being built. This is accomplished by providing the pressure pipe with an adjustable reducing valve so that with the pressure turned on from a source in which the pressure is in excess of that desired at any time the pressure delivered can be regulated to suit the conditions.

In the construction shown, the reducing valve 28 is located between a pipe 29 leading from the source of pressure and an equalizing reservoir 30 which is provided with a gage 31 to show the pressure as delivered to the motor. This reservoir 30 is shown as provided with a small vent valve 32 which is normally open during the operation of the machine. The reducing valve may be of any suitable construction and arrangement, the type of valve which is chosen for illustration being shown in section in Fig. 1. The valve as shown consists of a pressure chamber 33 having an inlet 34 and an outlet 35 which leads to the reservoir 30. The inlet 34 is controlled by an automatic needle valve 36 which is connected with a diaphragm 37 acted upon by a spring 38 the initial compression of which can be varied through the operation of an actuating lever 39, in order to afford more or less resistance to the fluid pressure in the chamber 33 acting on the opposite side of the diaphragm. It is obvious therefore, that as soon as the pressure builds up in the chamber 33 to an extent sufficient to balance the force of the spring 38 the inlet 34 will be closed and excess pressure shut off.

Assuming, for example, that fifty pounds of pressure is required to bring about the necessary tension, such pressure will be maintained in the motor cylinder during the forward movement of the carriage. Such forward movement continually reduces the capacity of the motor cylinder; and in order to prevent a consequent increase in pressure the small vent 32 is employed which in conjunction with the pressure regulator maintains a constant pressure throughout the operation. In view of the fact that the reservoir 30 is of considerable capacity the reduction of the entire pressure space due to the return movement of the piston is so small as to be nearly negligible, and the vent 32 may therefore, be of such small capacity that the amount of pressure wasted is immaterial. The pressure therefore, may be constantly turned on during the operation of building the tire so that the operation of the carriage itself is entirely automatic.

The vent 32, however, is shown as a cock which can be shut off when the machine is not in use or during the time taken to remove a finished carcass and apply a new core and the pressure pipe which leads from the reservoir 30 to the motor is also provided with a shut off cock for the same purpose.

What I claim is:

1. In a tire building machine, the combination with a rotatable core; of a stretching device adapted to receive one end of a strip of fabric, the other end of which is secured to the core; and a fluid pressure motor permanently connected with said stretching device whereby the said motor is utilized to perform the stretching operation while the core is stationary, and to maintain tension on the strip while the core is being positively rotated.

2. In a tire building machine, the combination with a rotatable core; of a traveling carriage adapted to receive one end of a strip of fabric the other end of which is secured to the core said carriage traveling in a direction transverse to the axis of the core; a fluid pressure motor adapted to operate on said carriage to draw it away from the core; and means for regulating the amount of pressure admitted to said motor, substantially as and for the purpose described.

3. In a tire building machine, the combination with a rotatable shaping core, of traveling means for holding one end of a strip of fabric, the other end of which is on the surface of the core said holding means being movable toward the core in line with the periphery thereof as the core rotates; and a fluid pressure tension device coöperating with said traveling means.

4. In a tire building machine, the combination with a rotatable shaping core, of traveling means for holding one end of a strip of fabric, the other end of which is on the surface of the core said holding means being movable toward the core in line with the periphery thereof as the core rotates; a fluid pressure tension device coöperating with said traveling means; and means for regulating the pressure.

5. In a tire building machine, the combination with a rotatable shaping core, of traveling means for holding one end of a strip of fabric, the other end of which is on the surface of the core; and means for applying fluid pressure to said traveling means to resist the movement thereof toward the core and to restore said traveling means to its normal position when released from the core.

6. In a tire building machine, the combination with a rotatable shaping core, of traveling means for holding one end of a strip of fabric, the other end of which is on the surface of the core; means for applying fluid pressure to said traveling means to resist the movement thereof toward the core; a pressure regulator; and a vent to maintain the tension pressure constant.

7. In a tire building machine, the combination with a rotatable core, of traveling means for holding one end of a strip of fabric, the other end of which is on the surface of the core; means for applying fluid pressure to said traveling means to resist the movement thereof toward the core, and to restore said traveling means to its normal position when released from the core; and means for checking the return movement of the traveling means.

8. In a tire building machine, a rotatable shaping core, a traveling carriage adapted to hold one end of a strip of fabric, the other end of which is adhered to the core the said carriage being movable in a direction transverse to the axis of the core; a fluid pressure motor connected with the carriage to move said carriage away from the core; an adjustable fluid pressure regulator for the pressure which operates the motor; a dash-pot for checking the speed of the motor when the movement of the carriage is not resisted; and an automatic brake connected with the carriage.

In testimony whereof, I have signed my name to this specification in the presence of two subscribing witnesses.

FREDERIC C. MORTON.

Witnesses:
JAS. J. MALONEY,
M. L. MALONEY.